(12) United States Patent
Wells et al.

(10) Patent No.: US 12,233,370 B2
(45) Date of Patent: Feb. 25, 2025

(54) FILTER ELEMENT WITH INTEGRAL BREATHER FILTER

(71) Applicant: Donaldson Company, Inc., Minneapolis, MN (US)

(72) Inventors: Jason A. Wells, Indianapolis, IN (US); Larry E. Gerken, Bowling Green, OH (US)

(73) Assignee: Donaldson Company, Inc., Bloomington, MN (US)

( * ) Notice: Subject to any disclaimer, the term of this patent is extended or adjusted under 35 U.S.C. 154(b) by 793 days.

(21) Appl. No.: 17/289,369

(22) PCT Filed: Oct. 31, 2019

(86) PCT No.: PCT/US2019/059239
§ 371 (c)(1),
(2) Date: Apr. 28, 2021

(87) PCT Pub. No.: WO2020/092824
PCT Pub. Date: May 7, 2020

(65) Prior Publication Data
US 2021/0394102 A1    Dec. 23, 2021

Related U.S. Application Data

(60) Provisional application No. 62/754,296, filed on Nov. 1, 2018.

(51) Int. Cl.
*B01D 46/00* (2022.01)
*B01D 46/24* (2006.01)
(Continued)

(52) U.S. Cl.
CPC ..... *B01D 46/0008* (2013.01); *B01D 46/0036* (2013.01); *B01D 46/0039* (2013.01);
(Continued)

(58) Field of Classification Search
CPC ............ B01D 46/0008; B01D 46/0036; B01D 46/0039; B01D 46/2414; B01D 46/521; B01D 53/261; B01D 2271/027
(Continued)

(56) References Cited

U.S. PATENT DOCUMENTS 4,504,289 A    3/1985   Waller
4,548,624 A   10/1985   Waller
(Continued)

OTHER PUBLICATIONS

"FIK In-Tank Filters", Hydraulic Filtration catalog, Donaldson Filtration Solutions, Donaldson Company, Inc., Minneapolis, Minnesota, at least as early as Oct. 1, 2018, pp. 64-73.
(Continued)

*Primary Examiner* — Robert A Hopkins
*Assistant Examiner* — Qianping He
(74) *Attorney, Agent, or Firm* — Mueting Raasch Group

(57) ABSTRACT

The technology disclosed herein relates to a filter element having a first endcap, a second endcap, and filter media extending between the first endcap and the second endcap. The filter media defines a central opening and is coupled to the first endcap and the second endcap. A filter cover is coupled to the first endcap, and a breather filter is integral to the filter cover. The breather filter defines a first flow face and a second flow face. The filter element defines an airflow pathway from ambient environment through the first flow face and the second flow face.

20 Claims, 12 Drawing Sheets

(51) Int. Cl.
  *B01D 46/52*    (2006.01)
  *B01D 53/26*    (2006.01)
(52) U.S. Cl.
  CPC ....... *B01D 46/2414* (2013.01); *B01D 46/521* (2013.01); *B01D 53/261* (2013.01); *B01D 2271/027* (2013.01)
(58) Field of Classification Search
  USPC .......................................................... 96/139
  See application file for complete search history.

(56) References Cited

U.S. PATENT DOCUMENTS

| | | | |
|---|---|---|---|
| 6,605,210 B2 | 8/2003 | Reinhardt | |
| 6,887,376 B2 | 5/2005 | Cella et al. | |
| 2006/0242933 A1* | 11/2006 | Webb | B01D 46/521 55/486 |
| 2010/0199958 A1* | 8/2010 | Heckel | B01D 46/2411 123/41.86 |
| 2014/0151386 A1* | 6/2014 | Alioto | F15B 1/26 220/745 |
| 2016/0169068 A1* | 6/2016 | Johnson | F16N 39/00 184/6.24 |
| 2017/0354917 A1* | 12/2017 | Gealy | B01D 53/261 |

OTHER PUBLICATIONS

Data Information Sheet, "T.R.A.P. TM Breather Technology for Hydraulic and Lube Oil Reservoirs", Donaldson Filtration Solutions, Donaldson Company, Inc., Minneapolis, Minnesota, 2015, 6 pages.
International Patent Application No. PCT/US2019/059239, filed Oct. 31, 2019; International Search Report and Written Opinion mailed Mar. 16, 2020; 13 pages.
International Patent Application No. PCT/US2019/059239, filed Oct. 31, 2019; Invitation to Pay Additional Fees and Partial Search Report issued Jan. 23, 2020; 11 pages.

* cited by examiner

FILTER ELEMENT WITH INTEGRAL BREATHER FILTER

CROSS REFERENCE TO RELATED APPLICATIONS

This application is the § 371 U.S. National Stage of International Application No. PCT/US2019/059239, filed 31 Oct. 2019, which claims the benefit of U.S. Provisional Application No. 62/754,296, filed 1 Nov. 2018, the disclosures of which are incorporated by reference herein in their entireties.

FIELD OF THE TECHNOLOGY

The technology disclosed herein generally relates to filter elements. More particularly, the technology disclosed herein relates to filter elements with an integral breather filter.

SUMMARY

Some embodiments of the technology disclosed herein relates to a filter element having a first endcap, a second endcap, and filter media extending between the first endcap and the second endcap. The filter media defines a central opening and is coupled to the first endcap and the second endcap. A breather filter housing is coupled to the first endcap. A filter cover is coupled to the breather filter housing, where the breather filter housing and the filter cover mutually define a breather filter cavity. A breather filter is disposed in the breather filter cavity. The breather filter defines a first flow face and a second flow face. The breather filter housing defines a first tortuous airflow pathway between an ambient environment and the first flow face, and the filter cover defines a second tortuous airflow pathway between the ambient environment and the second flow face.

In some such embodiments, the filter cover defines a fill port that is central to the filter cover. Additionally or alternatively, the fill port extends in the longitudinal direction. Additionally or alternatively, the breather filter has a desiccant. Additionally or alternatively, the breather filter has a regenerative hygroscopic filter. Additionally or alternatively, the breather filter housing has a main portion and an airflow channel plate, wherein the main portion and the airflow channel plate mutually define the first tortuous airflow pathway. Additionally or alternatively, the filter element has a plurality of spacers extending between the first endcap and the breather filter housing. Additionally or alternatively, the first flow face of the breather filter is an outer radial flow face and the second flow face of the breather filter is an inner radial flow face; and wherein the breather filter and the filter media share a central axis. Additionally or alternatively, the filter media is pleated.

Some embodiments of the technology disclosed herein relates to a filter element having a first endcap, a second endcap, and filter media extending between the first endcap and the second endcap. The filter media defines a central opening and is coupled to the first endcap and the second endcap. A filter cover is coupled to the first endcap, and a breather filter is integral to the filter cover. The breather filter defines a first flow face and a second flow face. The filter element defines an airflow pathway from ambient environment through the first flow face and the second flow face.

In some embodiments, a breather filter housing is coupled to the first endcap and the filter cover, where the breather filter housing and the filter cover mutually define a breather filter cavity. Additionally or alternatively, the breather filter is disposed in the breather filter cavity. Additionally or alternatively, the airflow pathway is tortuous. Additionally or alternatively, the filter cover defines a fill port that is central to the filter cover. Additionally or alternatively, the fill port extends in the longitudinal direction. Additionally or alternatively, the breather filter comprises a desiccant. Additionally or alternatively, the breather filter comprises a regenerative hygroscopic filter. Additionally or alternatively, the first endcap comprising a main portion and an airflow channel plate, wherein the main portion and the airflow channel plate mutually define the airflow pathway. Additionally or alternatively, the filter element has a plurality of spacers extending from the first endcap to the breather filter housing. Additionally or alternatively, the first flow face of the breather filter is an outer radial flow face and the second flow face of the breather filter is an inner radial flow face, where the breather filter and the filter media share a central axis.

Some embodiments of the technology disclosed herein relate to a filter element having filter media extending in a longitudinal direction, where the filter media has a first end, a second end, and defines a central opening having a central axis. A first endcap is coupled to the first end of the filter media. A spacer is coupled to the first endcap, where the spacer extends away from the filter media in the longitudinal direction. A sealing surface is coupled to the spacer, where the sealing surface has a plurality of seals such as a main seal and two secondary seals, where the secondary seals are positioned 140°-220° from each other relative to the central axis.

In some such embodiments, each of the two secondary seals are radial seals. Additionally or alternatively, the filter element has a breather filter housing defining the sealing surface, where each of the two secondary seals surround an airflow pathway defined by the breather filter housing. Additionally or alternatively, the filter element has a filter cover coupled to the breather filter housing, where the breather filter housing and the filter cover mutually define a breather filter cavity. Additionally or alternatively, the filter element has a breather filter disposed in the breather filter cavity, where the breather filter defines a first flow face and a second flow face. Additionally or alternatively, the breather filter housing defines a first tortuous airflow pathway between an ambient environment and the first flow face, and the filter cover defines a second tortuous airflow pathway between the ambient environment and the second flow face. Additionally or alternatively, the breather filter housing has a main portion and an airflow channel plate where the main portion and the airflow channel plate mutually define the first tortuous airflow pathway. Additionally or alternatively, the main seal is an outer radial seal. Additionally or alternatively, the main seal is central to the two secondary seals. Additionally or alternatively, the first endcap defines two protrusions extending toward the first end of the filter media and each secondary seal is disposed on a protrusion.

Some embodiments of the technology disclosed herein relate to a filter element having filter media extending in a longitudinal direction, where the filter media has a first end and a second end and defines a central opening. A first endcap is coupled to the first end of the filter media. A spacer is coupled to the first endcap. A sealing surface is coupled to the spacer, where the sealing surface defines a plurality of protrusions. The spacer extends away from the filter media in the longitudinal direction between the first endcap and the sealing surface, and the plurality of protrusions each extend towards the first end of the filter media. The plurality of protrusions include a main protrusion, a first secondary protrusion, and a second secondary protrusion. The main protrusion has a first perimeter length, the first secondary protrusion has a second perimeter length, and the second secondary protrusion has a third perimeter length, where the first perimeter length is at least 3 times each of the second perimeter length and the third perimeter length.

In some such embodiments, each of the plurality of protrusions has a seal disposed thereon. Additionally or alternatively, each seal is a radial seal. Additionally or alternatively, the first secondary protrusion is positioned 140°-220° from the second secondary protrusion relative to the main protrusion. Additionally or alternatively, the filter element has a breather filter housing defining the sealing surface, where each of the secondary seals surround an airflow pathway defined by the breather filter housing. Additionally or alternatively, the filter element has a filter cover coupled to the breather filter housing, where the breather filter housing and the filter cover mutually define a breather filter cavity. Additionally or alternatively, the filter element has a breather filter disposed in the breather filter cavity, wherein the breather filter defines a first flow face and a second flow face. Additionally or alternatively, the breather filter housing defines a first tortuous airflow pathway between an ambient environment and the first flow face, and the filter cover defines a second tortuous airflow pathway between the ambient environment and the second flow face. Additionally or alternatively, the breather filter housing has a main portion and an airflow channel plate wherein the main portion and the airflow channel plate mutually define the first tortuous airflow pathway.

Figure 1:
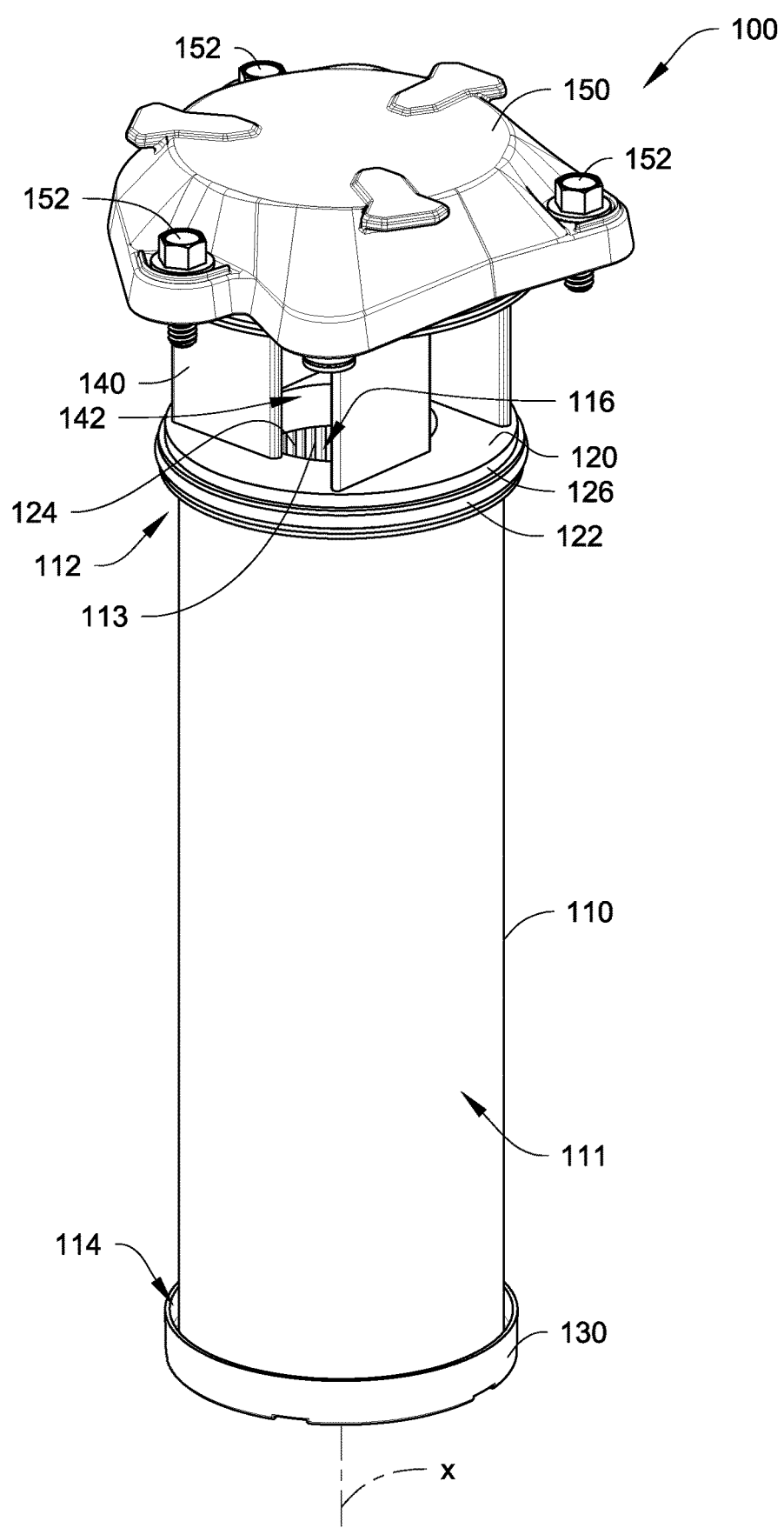
FIG. 1 is a perspective view of an example filter element consistent with the technology disclosed herein.

The current technology may be more completely understood and appreciated in consideration of the following detailed description of various embodiments of the current technology in connection with the accompanying drawings.

DETAILED DESCRIPTION

The technology disclosed herein generally relates to a liquid filter element that has an integrated breather filter. The breather filter can be integral to a filter element cover and a breather filter housing. As such, when an existing filter element is replaced in a filtration system with a new filter element, the breather filter is inherently replaced as well. Filter elements consistent with the current technology can be used in hydraulic filtration systems, for example. In the normal use of a hydraulic system, hydraulic fluid is rapidly depleted and added to the fluid reservoir, necessitating corresponding airflow into and out of the reservoir. It can be desirable to limit the moisture and debris that enters into the hydraulic system from the ambient environment. Further, it can be desirable to reduce the number of components to replace.

Some embodiments of the technology disclosed herein relates to a filter element having a first endcap, a second endcap, and filter media extending between the first endcap and the second endcap. The filter media defines a central opening and is coupled to the first endcap and the second endcap. A breather filter housing is coupled to the first endcap. A filter cover is coupled to the breather filter housing, where the breather filter housing and the filter cover mutually define a breather filter cavity. A breather filter is disposed in the breather filter cavity. The breather filter defines a first flow face and a second flow face. The breather filter housing defines a first tortuous airflow pathway between an ambient environment and the first flow face, and the filter cover defines a second tortuous airflow pathway between the ambient environment and the second flow face.

In some such embodiments, the filter cover defines a fill port that is central to the filter cover. Additionally or alternatively, the fill port extends in the longitudinal direction. Additionally or alternatively, the breather filter has a desiccant. Additionally or alternatively, the breather filter has a regenerative hygroscopic filter. Additionally or alternatively, the breather filter housing has a main portion and an airflow channel plate, wherein the main portion and the airflow channel plate mutually define the first tortuous airflow pathway. Additionally or alternatively, the filter element has a plurality of spacers extending between the first endcap and the breather filter housing. Additionally or alternatively, the first flow face of the breather filter is an outer radial flow face and the second flow face of the breather filter is an inner radial flow face; and wherein the breather filter and the filter media share a central axis. Additionally or alternatively, the filter media is pleated.

Some embodiments of the technology disclosed herein relates to a filter element having a first endcap, a second endcap, and filter media extending between the first endcap and the second endcap. The filter media defines a central opening and is coupled to the first endcap and the second endcap. A filter cover is coupled to the first endcap, and a breather filter is integral to the filter cover. The breather filter defines a first flow face and a second flow face. The filter element defines an airflow pathway from ambient environment through the first flow face and the second flow face.

In some such embodiments, a breather filter housing is coupled to the first endcap and the filter cover, where the breather filter housing and the filter cover mutually define a breather filter cavity. Additionally or alternatively, the breather filter is disposed in the breather filter cavity. Additionally or alternatively, the airflow pathway is tortuous. Additionally or alternatively, the filter cover defines a fill port that is central to the filter cover. Additionally or alternatively, the fill port extends in the longitudinal direction. Additionally or alternatively, the breather filter comprises a desiccant. Additionally or alternatively, the breather filter comprises a regenerative hygroscopic filter. Additionally or alternatively, the first endcap comprising a main portion and an airflow channel plate, wherein the main portion and the airflow channel plate mutually define the airflow pathway. Additionally or alternatively, the filter element has a plurality of spacers extending from the first endcap to the breather filter housing. Additionally or alternatively, the first flow face of the breather filter is an outer radial flow face and the second flow face of the breather filter is an inner radial flow face, where the breather filter and the filter media share a central axis.

Some embodiments of the technology disclosed herein relate to a filter element having filter media extending in a longitudinal direction, where the filter media has a first end, a second end, and defines a central opening having a central axis. A first endcap is coupled to the first end of the filter media. A spacer is coupled to the first endcap, where the spacer extends away from the filter media in the longitudinal direction. A sealing surface is coupled to the spacer, where the sealing surface has a plurality of seals such as a main seal and two secondary seals, where the secondary seals are positioned 140°-220° from each other relative to the central axis.

In some such embodiments, each of the two secondary seals are radial seals. Additionally or alternatively, the filter element has a breather filter housing defining the sealing surface, where each of the two secondary seals surround an airflow pathway defined by the breather filter housing. Additionally or alternatively, the filter element has a filter cover coupled to the breather filter housing, where the breather filter housing and the filter cover mutually define a breather filter cavity. Additionally or alternatively, the filter element has a breather filter disposed in the breather filter cavity, where the breather filter defines a first flow face and a second flow face. Additionally or alternatively, the breather filter housing defines a first tortuous airflow pathway between an ambient environment and the first flow face, and the filter cover defines a second tortuous airflow pathway between the ambient environment and the second flow face. Additionally or alternatively, the breather filter housing has a main portion and an airflow channel plate where the main portion and the airflow channel plate mutually define the first tortuous airflow pathway. Additionally or alternatively, the main seal is an outer radial seal. Additionally or alternatively, the main seal is central to the two secondary seals. Additionally or alternatively, the first endcap defines two protrusions extending toward the first end of the filter media and each secondary seal is disposed on a protrusion.

Some embodiments of the technology disclosed herein relate to a filter element having filter media extending in a longitudinal direction, where the filter media has a first end and a second end and defines a central opening. A first endcap is coupled to the first end of the filter media. A spacer is coupled to the first endcap. A sealing surface is coupled to the spacer, where the sealing surface defines a plurality of protrusions. The spacer extends away from the filter media in the longitudinal direction between the first endcap and the sealing surface, and the plurality of protrusions each extend towards the first end of the filter media. The plurality of protrusions include a main protrusion, a first secondary protrusion, and a second secondary protrusion. The main protrusion has a first perimeter length, the first secondary protrusion has a second perimeter length, and the second secondary protrusion has a third perimeter length, where the first perimeter length is at least 3 times each of the second perimeter length and the third perimeter length.

In some such embodiments, each of the plurality of protrusions has a seal disposed thereon. Additionally or alternatively, each seal is a radial seal. Additionally or alternatively, the first secondary protrusion is positioned 140°-220° from the second secondary protrusion relative to the main protrusion. Additionally or alternatively, the filter element has a breather filter housing defining the sealing surface, where each of the secondary seals surround an airflow pathway defined by the breather filter housing. Additionally or alternatively, the filter element has a filter cover coupled to the breather filter housing, where the breather filter housing and the filter cover mutually define a breather filter cavity. Additionally or alternatively, the filter element has a breather filter disposed in the breather filter cavity, wherein the breather filter defines a first flow face and a second flow face. Additionally or alternatively, the breather filter housing defines a first tortuous airflow pathway between an ambient environment and the first flow face, and the filter cover defines a second tortuous airflow pathway between the ambient environment and the second flow face. Additionally or alternatively, the breather filter housing has a main portion and an airflow channel plate wherein the main portion and the airflow channel plate mutually define the first tortuous airflow pathway.

Figure 2:
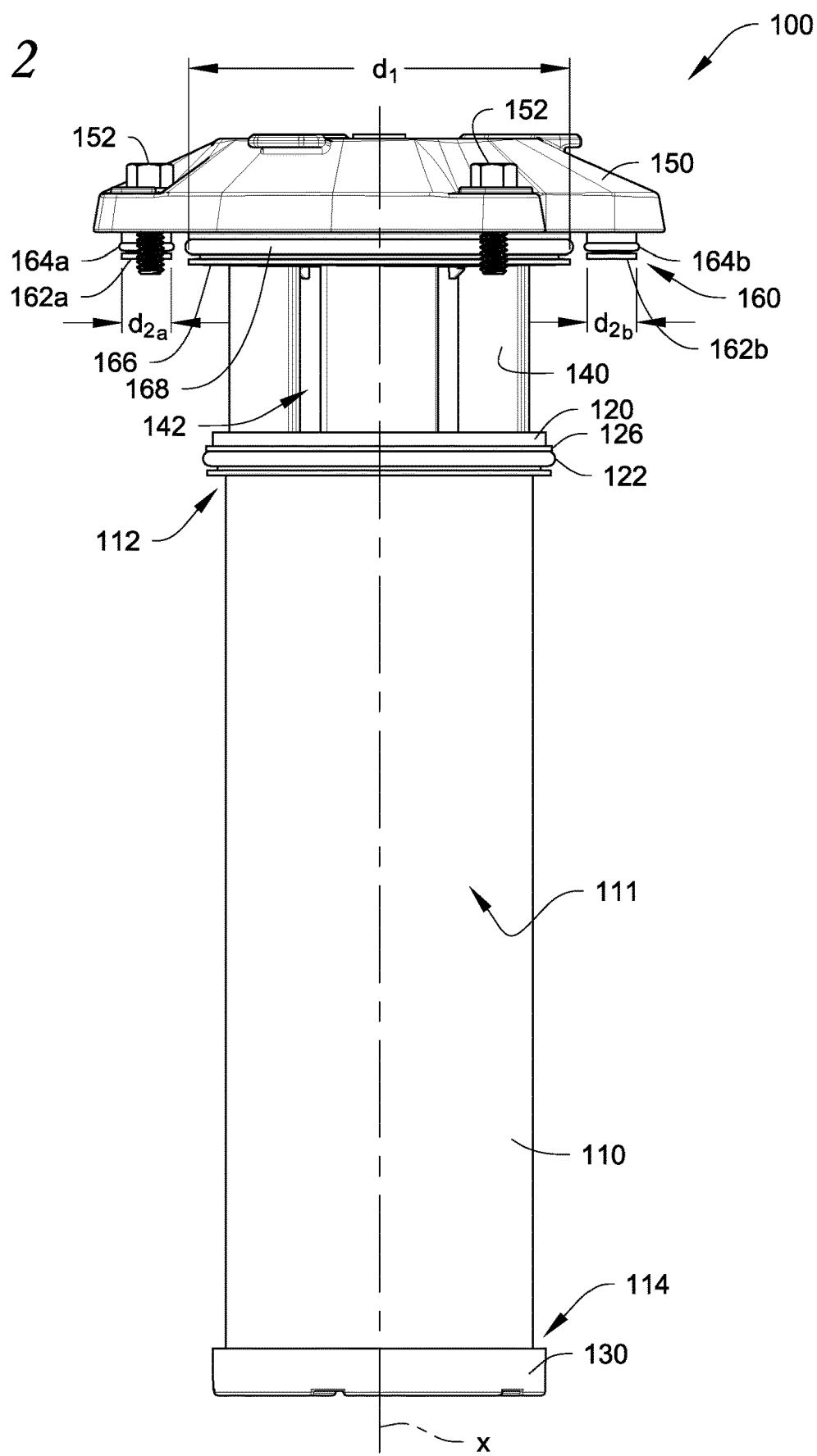
FIG. 2 is a facing view a filter element consistent with FIG. 1.

FIG. 1 is a perspective view of an example filter element 100 consistent with the technology disclosed herein, and FIG. 2 is a facing view of the example filter element 100. The filter element 100 has a first endcap 120, a second endcap 130, and filter media 110 extending between the first endcap 120 and the second endcap 130 in a longitudinal direction. A spacer 140 extends between the first endcap 120 and a sealing surface 160. A filter cover 150 is coupled to the first endcap 120.

The filter media 110 is generally configured to filter a fluid. In some embodiments the filter media 110 is configured to filter hydraulic fluid. The filter media 110 has a first end 112 and a second end 114, where the first end 112 of the filter media 110 is coupled to the first endcap 120 and the second end 114 of the filter media 110 is coupled to the second endcap 130. The filter media 110 generally has a cylindrical arrangement and defines a central opening 116 extending from the first end 112 to the second end 114. The filter media 110 and the central opening 116 share a central axis x.

The filter media 110 can be constructed of a variety of materials and combinations of materials. In some embodiments the filter media 110 is constructed of fibers. The filter media 110 is pleated in various embodiments. In some such embodiments, the filter media 110 has a first set of pleat folds cumulatively defining an outer flow face 111 of the filter media 110 and a second set of pleat folds cumulatively defining an inner flow face 113 of the filter media 110. In some embodiments the inner flow face 113 is upstream of the outer flow face 111 relative to fluid flow through the filter media 110, but in other embodiments the outer flow face 111 is upstream of the inner flow face 113. In some embodiments one or more support screens can abut the filter media 110 to provide structural support to the filter media. A support screen can abut the outer flow face 111 and/or the inner flow face 113 of the filter media 110.

The first endcap 120 and second endcap 130 are generally configured to retain the ends of the filter media 110 and create a portion of a fluid flow pathway through the filter media 110. In the current example, the first endcap 120 defines an endcap opening 124 that is in communication with the central opening 116 of the filter media 110. The first endcap 120 has an endcap seal 122 disposed about an outer surface 126 (particularly visible in FIG. 4A, which provides a cross-sectional view of the first endcap 120) of the first endcap 120 that is configured to form a seal with filtration system components, which will be described in more detail, below. The first endcap 120 shares the central axis x of the filter media 110 and central opening 116.

In various embodiments, the spacer 140 is coupled to the first endcap 120. The spacer 140 generally extends away from the filter media 110 in the longitudinal direction. The spacer 140 defines an open volume 142 adjacent to the opening 124 of the first endcap 140. The open volume 142 is a portion of a fluid flow pathway defined through the filter element 100. In some embodiments, such as the one depicted, a plurality of spacers 140 are coupled to the first endcap 120, and the plurality of spacers 140 mutually define the open volume 142 that is a portion of the fluid flow pathway through the filter element 100. In some embodiments one or more spacers 140 can define one or more openings 144, such as those visible in FIG. 4A. The openings 144 are configured to accommodate fluid flow therethrough.

The filter cover 150 of the filter element 100 is generally configured to fix the filter element 100 to a filtration system (not shown). In particular, the filter cover 150 is generally configured to be secured to a filter head of the filtration system. The filter cover 150 has one or more coupling elements 152 that are configured to be secured to the filter head. The one or more coupling elements 152 can be bolts, screws, a clamp(s), and the like. In some embodiments, the one or more coupling elements 152 can have a bayonet connector.

Figure 4A:
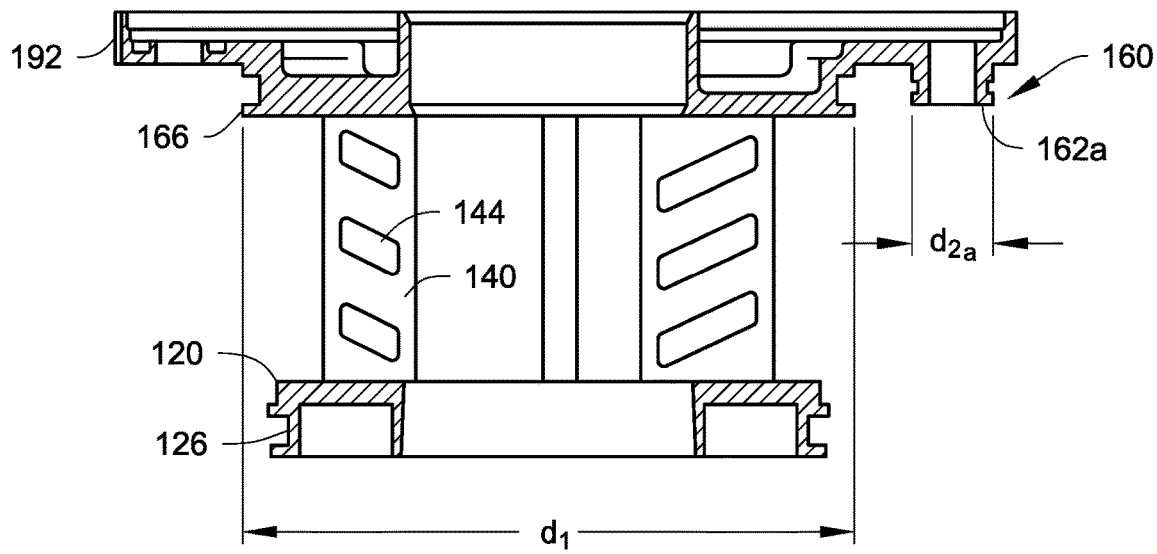
FIG. 4A is a cross-sectional view of an example filter element component consistent with various embodiments.
Figure 4B:
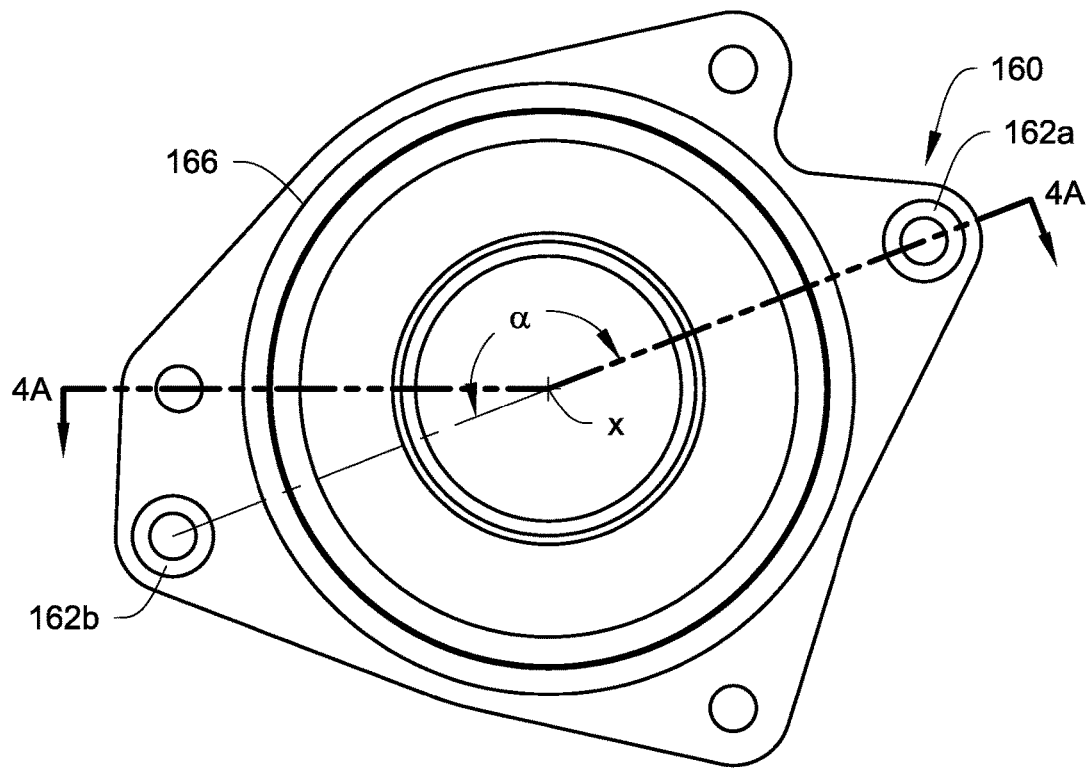
FIG. 4B is a facing view of the example filter element component of FIG. 4A.

Particularly visible in FIG. 2, the sealing surface 160 of the filter element 100 is configured to create a fluid seal with filtration system components. In particular, the sealing surface 160 is generally configured to create a fluid seal with a filter head when the filter cover 150 is secured to the filter head. FIG. 4A provides a cross-sectional view of the component (a main portion 192 of a breather filter housing, described in more detail, below) forming the sealing surface 160 and FIG. 4B provides a facing view of the component forming the sealing surface 160. The sealing surface 160 is coupled to the spacer 140. The sealing surface 160 can have a variety of configurations, but in the current example, the sealing surface 160 defines protrusions 162, 166 extending towards the first end 112 of the filter media 110. The protrusions 162, 166 are configured to be sealably received by mating features of a filter head. In particular, each of the protrusions 162, 166 have a seal 164 (visible in FIG. 2), 168 disposed thereon. The seals 164, 168 can be a variety of types of seals, but in the current embodiments the seals 164, 168 are each outer radial seals disposed about the protrusions 162, 166. In some embodiments the seals can be axial seals.

In the current example, the protrusions have a main protrusion 166, a first secondary protrusion 162, and a second secondary protrusion 162. The main protrusion 166 can generally be larger than the secondary protrusions 162, in some embodiments. For example, the main protrusion 166 can have a first perimeter length $p_1$ that is at least 3, 5 or 7 times the perimeter length $p_{2a}$, $p_{2b}$ of each of the first and second secondary protrusions 162a, 162b, respectively. Each of the perimeter lengths can be measured at the widest portion of the particular protrusion around the protrusion. In the current example, the main protrusions 166 is circular, so the first perimeter length $p_1$ is the circumference of the main protrusions 166 that can be calculated based on the outer diameter di(visible in FIGS. 2 and 4A). Similarly, in the current example, the secondary protrusions 162a, 162b are circular, so each of their respective perimeter lengths $p_{2a}$, $p_{2b}$ is the circumference of the respective secondary protrusion calculated based on its outer diameter $d_{2a}$, $d_{2b}$.

The main protrusion 166 is central to the secondary protrusions 162. In various embodiments, as is visible in FIG. 4B, the first secondary protrusion 162a is positioned at an angle α of 140°-220°, 160°-200°, or 170°-190° from the second secondary protrusion 162b relative to the central axis x. In the current example, the first secondary protrusion 162a is at an angle α of 179°-181°, and in particular, 180° from the second secondary protrusion 162b relative to the central axis x.

The seal disposed about the main protrusion 166 can be referred to as a main seal 168, and the seal disposed about the secondary protrusions 162 can be referred to as secondary seals 164. The main seal 168 is central to the secondary seals 164 in the current example. The secondary seals are positioned 140°-220°, 160°-200°, or 170°-190° from each other relative to the central axis x. In particular, the secondary seals are positioned about 180° from each other relative to the central axis x.

Figure 3A:
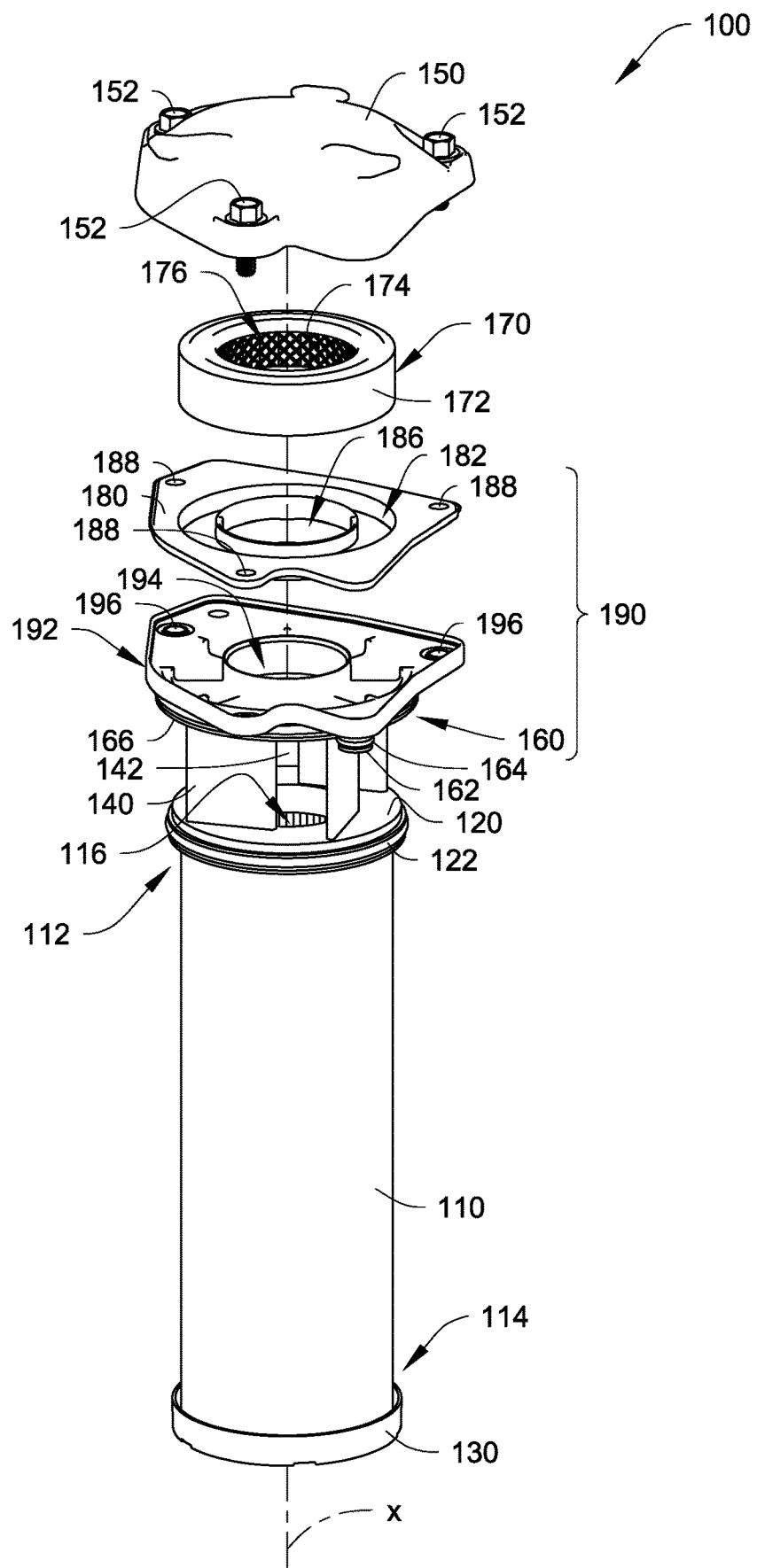
FIG. 3A is a first perspective exploded view of a filter element consistent with FIG. 2.
Figure 3B:
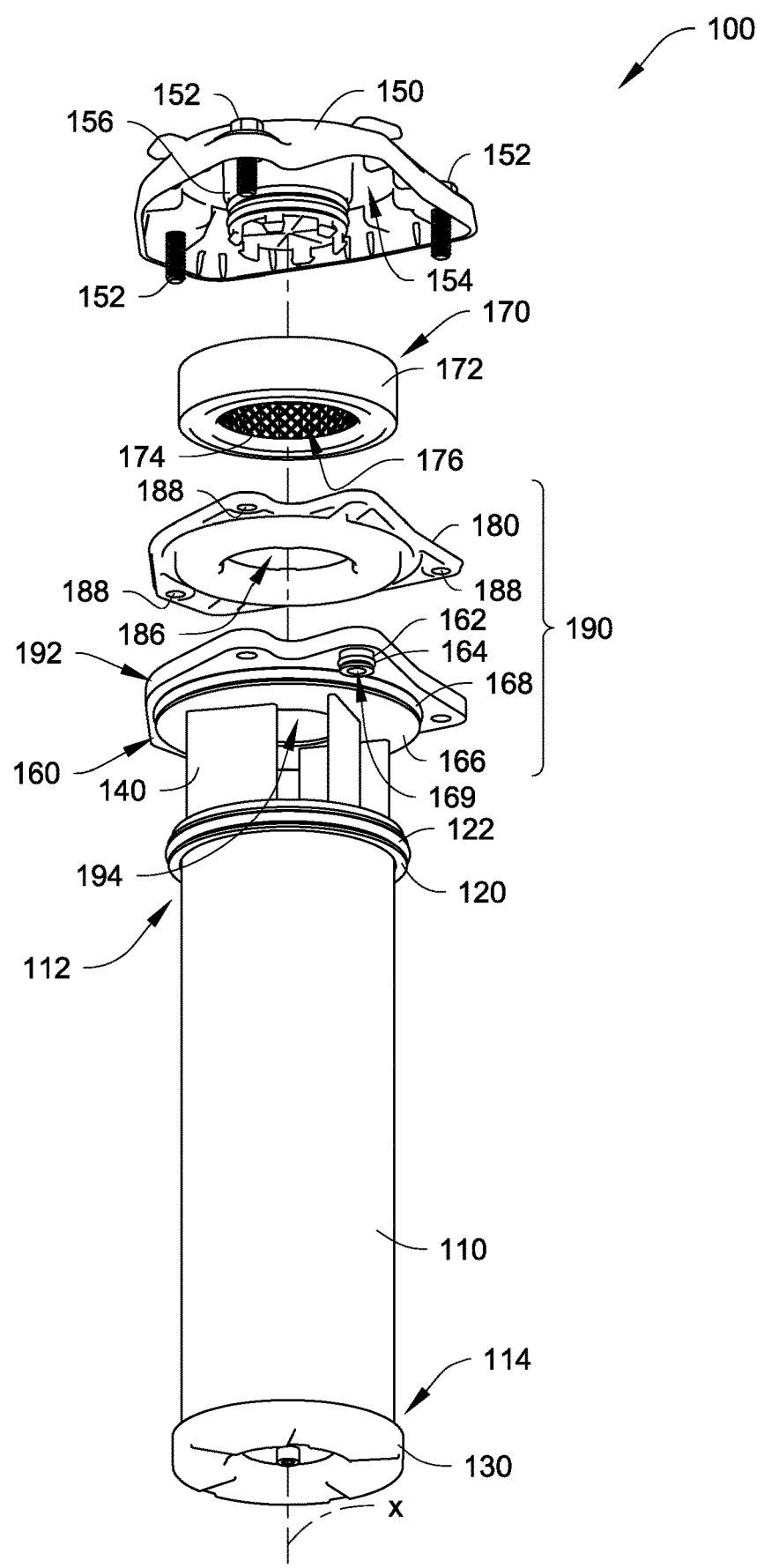
FIG. 3B is a second perspective exploded view of a filter element consistent with FIG. 2.

FIG. 3A is a first perspective exploded view of a filter element 100 consistent with FIG. 2, and FIG. 3B is a second perspective exploded view of a filter element 100 consistent with FIG. 2. The filter element 100 has generally been described above, but additional components of the filter element 100 are now visible. In particular, a breather filter 170 is integral to the filter cover 150.

The breather filter 170 is generally configured to filter gaseous fluid passing between the ambient environment and the filter element 100. In some embodiments the breather filter 170 is configured to prevent moisture in the ambient environment from passing into the filter element 100. In some embodiments the breather filter 170 has a desiccant. In some embodiments the breather filter 170 is a regenerative hygroscopic filter. As an example, the breather filter 170 can be a T.R.A.P. breather filter manufactured by Donaldson Corporation headquartered in Bloomington, Minnesota Other types of breather filters 170 are also contemplated.

The breather filter 170 defines a first flow face 172 and a second flow face 174. In examples, the first flow face 172 is an outer radial flow face and the second flow face 174 is an inner radial flow face, and the breather filter 170 defines a central opening 176. In a variety of implementations, the first flow face 172 and the second flow face 174 each operate as both an upstream flow face and a downstream flow face, depending on whether gaseous fluid is entering or exiting the filter element 100. The filter element 110 generally defines an airflow pathway from the ambient environment through the first flow face 172 and the second flow face 174 of the filter element 100. The breather filter 170 shares the central axis x with the filter media 110.

The breather filter 170 is disposed in a breather filter cavity 154, 182 that is mutually defined by the filter cover 150 and a breather filter housing 190. The filter cover 150 defines a first portion 154 of the breather filter cavity and the breather filter housing 190 defines a second portion 182 of the breather filter cavity. The filter cover 150 defines an extension portion 156 that extends through the central opening 176 of the breather filter 170 towards the first end 112 of the filter media 110.

The breather filter housing 190 is coupled to the filter cover 150 and the first endcap 120. In particular, the spacers 140 extend between and are coupled to the endcap 120 and the breather filter housing 190. The breather filter housing 190 generally defines the sealing surface 160, which was described above in the discussion of FIGS. 1-2. In examples consistent with the current embodiment, the breather filter housing 190 has a main portion 192, which defines the sealing surface 160, and an airflow channel plate 180. The main portion 192 and the airflow channel plate 180 are generally fixed together. In particular, the main portion 192 defines first mating features 196 and the airflow channel plate 180 defines second mating features 188, where the first and second mating features are configured to be engaged by corresponding coupling elements 152 of the filter cover 150. The main portion 192 and the airflow channel plate 180 mutually define a tortuous airflow pathway extending from the ambient environment to a flow face of the breather filter 170, which will be described in more detail, below.

The airflow channel plate 180 defines a central opening 186 and the main portion 192 of the breather filter housing 190 defines a central opening 194 that are each in communication with the central opening of the breather filter 170, the open volume 142 defined by the spacers 140, and the central opening 116 of the filter media 110.

The secondary seals 164 on the secondary protrusions 162 of the sealing surface 160 surround a first end 169 of an airflow pathway defined by the breather filter housing 190, which will be described in more detail with respect to FIG. 6, below. The airflow channel plate 180 is configured to nest within the main portion 192 of the breather filter housing 190 to define a portion of the airflow pathway therebetween.

In examples consistent with the current embodiment, the first endcap 120, the spacers 140, and the main portion 192 of the breather filter housing 190 are a cohesive component. However, in some other embodiments, the first endcap 120, the spacers 140, and the main portion 192 of the breather filter housing 190 can be separate components that are coupled through various fastening structures. Also, while the main portion 192 of the breather filter housing 190 and the airflow channel plate 180 are separate components that are coupled together, in some embodiments the main portion 192 and the airflow channel plate 180 are a single, cohesive component.

Figure 5:
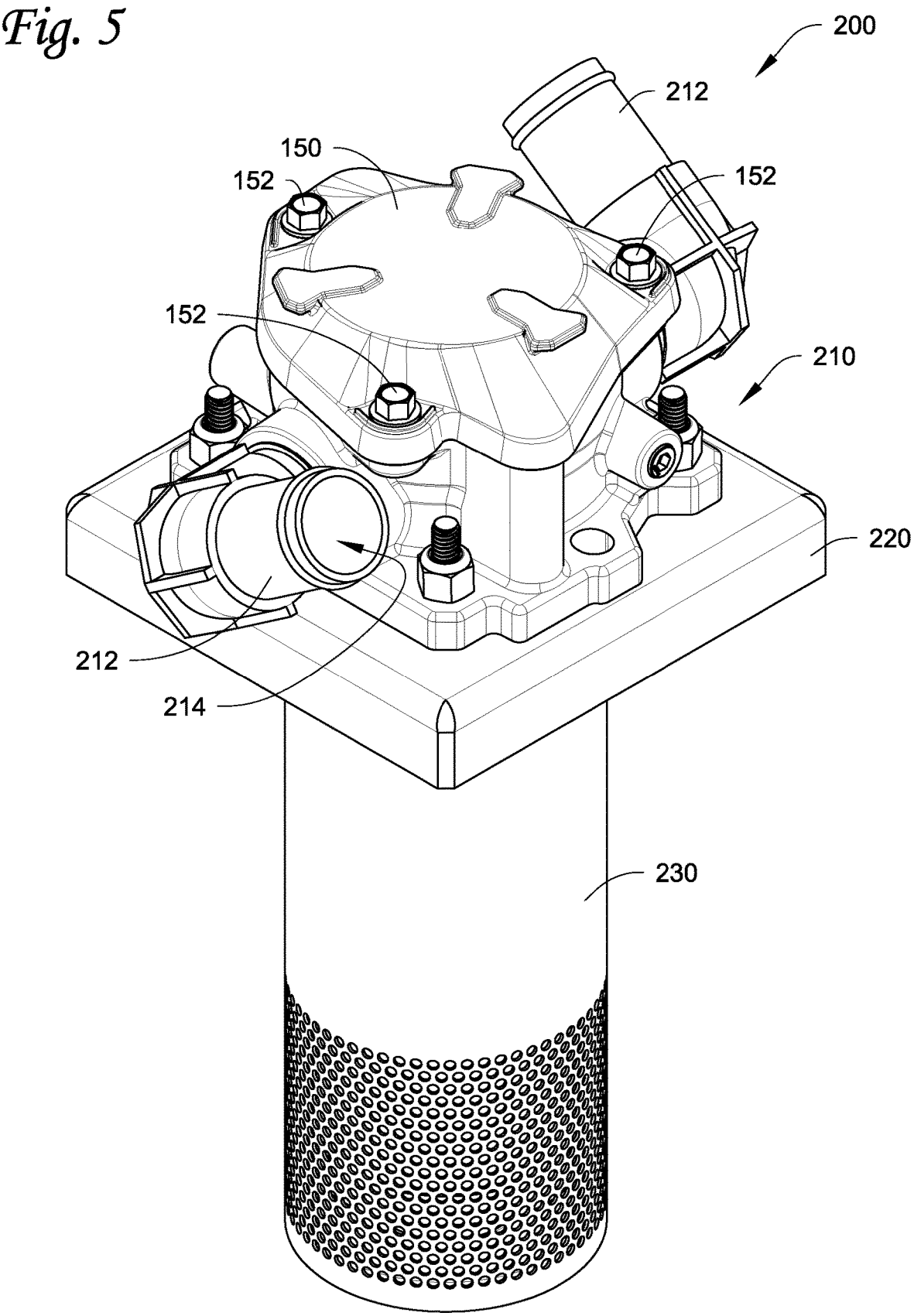
FIG. 5 is a perspective view of an example implementation of a filter element consistent with FIG. 2.
Figure 6:
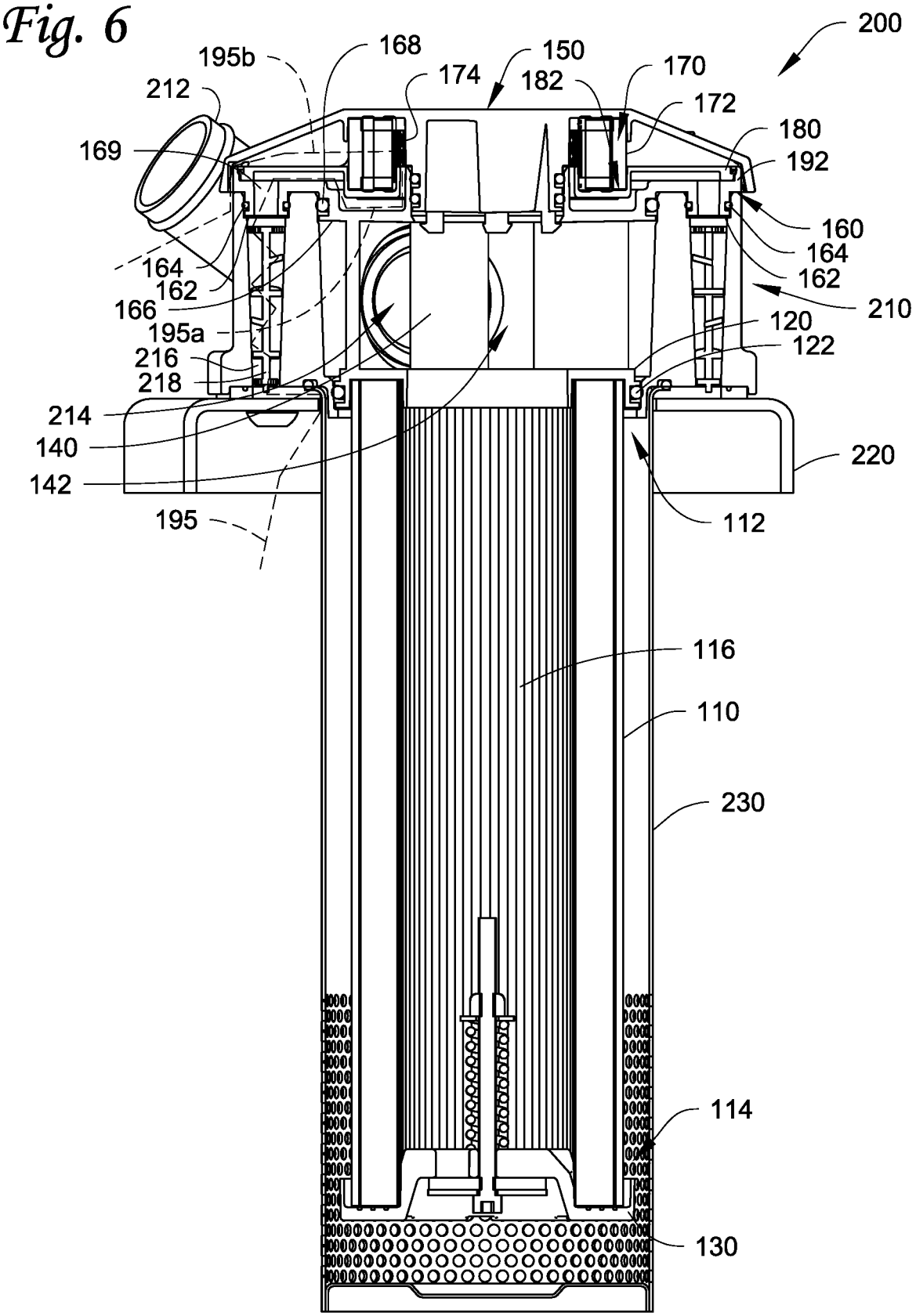
FIG. 6 is a cross-sectional view of an example implementation consistent with FIG. 5.

FIG. 5 is a perspective view of an example implementation of a filter element 100 consistent with FIG. 2, and FIG. 6 is a cross-sectional view of the example implementation of FIG. 5. The filter element 100 is installed in a filtration system 200. In particular, the filter media 110 of the filter element 100 is inserted into a housing diffuser 230 within a filter bowl 220 (only a portion of which is depicted for clarity), and the filter cover 150 is coupled to a filter head 210 via the coupling elements 152. The seals 164, 168 that are disposed on the respective protrusions 162, 166 of the sealing surface 160 each forms a seal with a corresponding structure of the filter head 210. Similarly, the endcap seal 122 disposed about the first endcap 120 forms a seal with a corresponding structure of the filter head 210. The corresponding structures of the filter head are inner radial surfaces, in the current example. Conduits 212 extend from the filter head 210 and define a fluid flow pathway 214 leading to the open volume 142 defined by the spacers 140.

A tortuous airflow pathway 195 defined by the filtration system 200 is best visible in FIG. 6. The tortuous airflow pathway 195 has a first segment 195a and a second segment 195b defined by the filter element 100 (the filter element 100 is more clearly visible in FIGS. 1-3B). Each of the first segment 195a and second segment 195b are tortuous. The main portion 192 of the breather filter housing 190 (see FIG. 3B) and the airflow channel plate 180 mutually define the first segment 195a of the tortuous airflow pathway that extends from a first end 169 of the airflow pathway defined by the secondary protrusion 162 to the second flow face 174 of the breather filter 170. The first end 169 of the airflow pathway 195a is in communication with the interior of the filter bowl 220 through the filter head 210. The filter head 210 defines an airflow channel 216 that is configured to be in sealable communication with the first end 169 of the first tortuous airflow pathway 195a defined by the secondary protrusion 162. When the filter element 100 is uninstalled, such as depicted in FIGS. 1-3B, the first tortuous airflow pathway 195a is generally in communication with the ambient environment.

"Tortuous," as used herein, means that the airflow pathway is at least more convoluted than a straight line. The tortuous airflow pathway can prevent the passage of liquids and debris to the breather filter 170. When the filter element 100 is installed in a filtration system 200, the tortuous airflow pathway 195 can be oriented to enable the drainage of fluids under the force of gravity that might inadvertently enter the tortuous airflow pathway 195. In the current example, a baffle 218 is disposed within the airflow channel 216 to create a tortuous airflow pathway within the airflow channel 216, as well.

The second segment 195b of the tortuous airflow pathway 195 extends between the ambient environment and the first flow face 172 of the breather filter 170. As such, the first segment 195a and the second segment 195b are in communication through the breather filter 170. The second segment 195b of the tortuous airflow pathway 195 is defined by the filter cover 150. In various embodiments, including the one depicted, the second segment 195b of the tortuous airflow pathway 195 is mutually defined by the filter cover 150 and the breather filter housing 190, in particular the airflow channel plate 180.

Figure 7:
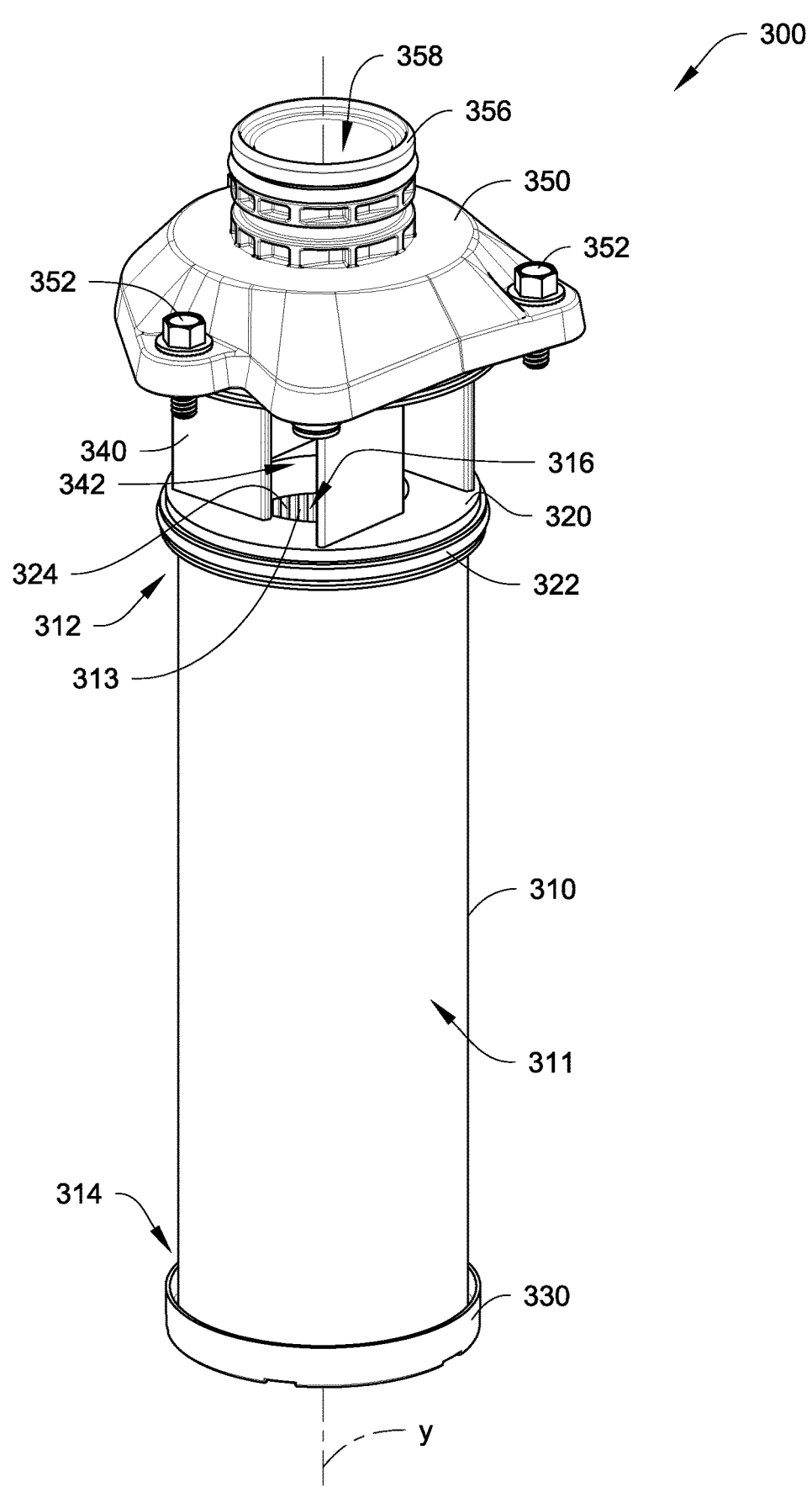
FIG. 7 is a perspective view of another example filter element consistent with the technology disclosed herein.
Figure 8:
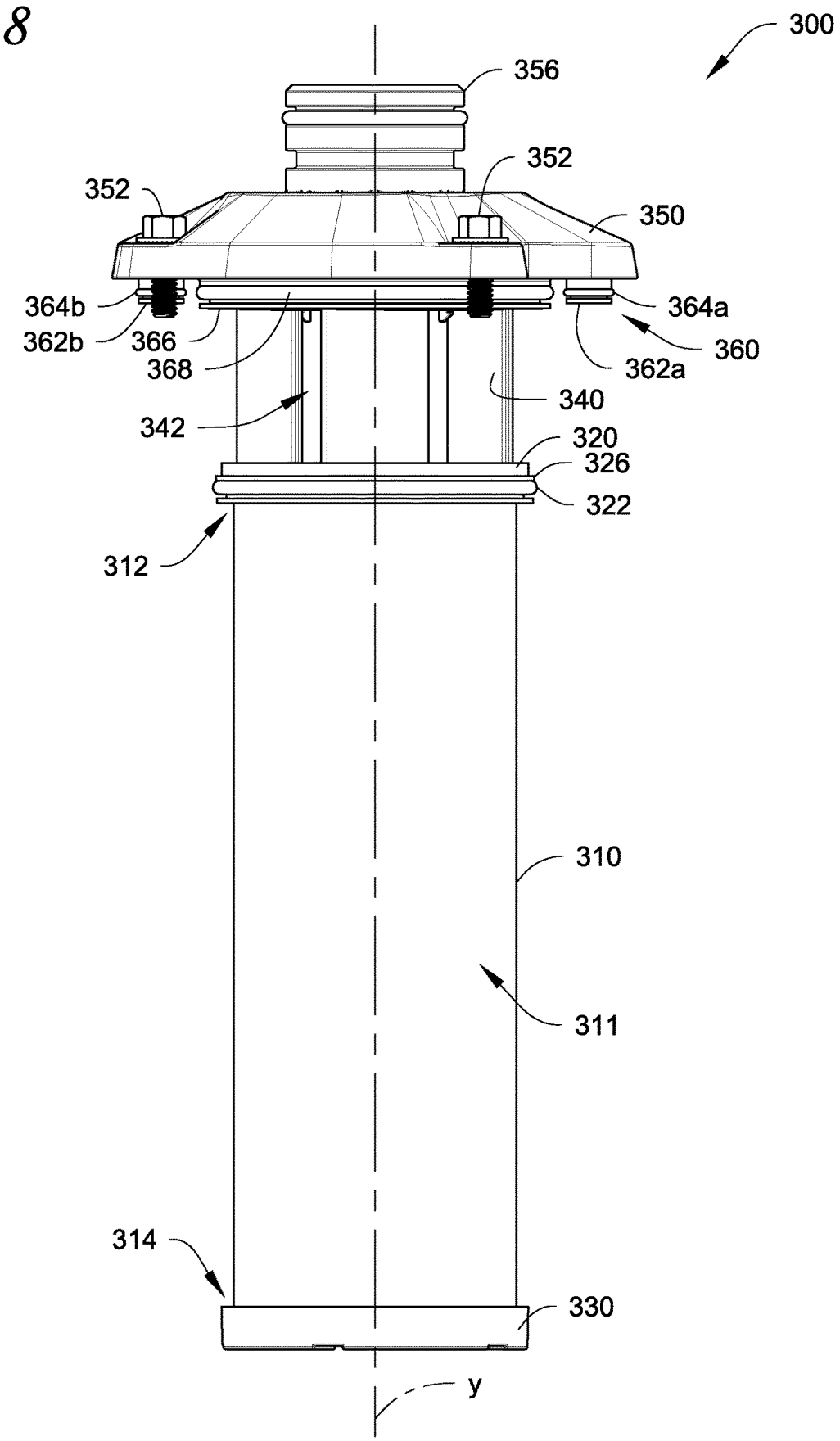
FIG. 8 is a facing view of an example filter element consistent with FIG. 7.

FIG. 7 is a perspective view of another example filter element consistent with the technology disclosed herein, and FIG. 8 is a facing view of a filter element consistent with FIG. 7. The filter element 300 has a first endcap 320, a second endcap 330, and filter media 310 extending between the first endcap 320 and the second endcap 330 in a longitudinal direction. A spacer 340 extends between the first endcap 320 and a sealing surface 360. A filter cover 350 is coupled to the first endcap 320.

In examples consistent with the current embodiment, the filter cover 350 defines a fill port 358. The fill port 358 can be defined by a tubular structure 356 extending in the longitudinal direction. The fill port 358 can be configured to direct fluid flow into the filter element 300. For example, in hydraulic systems, the fill port 358 can be configured to receive hydraulic fluid.

The filter media 310 is generally configured to filter a fluid. In some embodiments the filter media 310 is configured to filter hydraulic fluid. The filter media 310 has a first end 312 and a second end 314, where the first end 312 of the filter media 310 is coupled to the first endcap 320 and the second end 314 of the filter media 310 is coupled to the second endcap 330. The filter media 310 generally has a cylindrical arrangement and defines a central opening 316 extending from the first end 312 to the second end 314. The filter media 310 and the central opening 316 share a central axis y.

The filter media 310 can be constructed of a variety of materials and combinations of materials. In some embodiments the filter media 310 is constructed of fibers. The filter media 310 is pleated in various embodiments. In some such embodiments, the filter media 310 has a first set of pleat folds cumulatively defining an outer flow face 311 of the filter media 310 and a second set of pleat folds cumulatively defining an inner flow face 313 of the filter media 310. In some embodiments the inner flow face 313 is upstream of the outer flow face 311 relative to fluid flow through the filter media 310, but in other embodiments the outer flow face 311 is upstream of the inner flow face 313.

The first endcap 320 and second endcap 330 are generally configured to retain the ends of the filter media 310 and create a portion of a fluid flow pathway through the filter media 310. In the current example, the first endcap 320 defines an endcap opening 324 that is in communication with the central opening 316 of the filter media 310. The first endcap 320 has an endcap seal 322 disposed about an outer surface 326 of the first endcap 320 that is configured to form a seal with filtration system components, which will be described in more detail, below. The first endcap 320 shares the central axis y of the filter media 310 and central opening 316.

In various embodiments, the spacer 340 is coupled to the first endcap 320. The spacer 340 generally extends away from the filter media 310 in the longitudinal direction. The spacer 340 defines an open volume 342 adjacent to the opening 324 of the first endcap 340. The open volume 342 is a portion of a fluid flow pathway defined through the filter element 300. In some embodiments, such as the one depicted, a plurality of spacers 340 are coupled to the first endcap 320, and the plurality of spacers 340 mutually define the open volume 342 that is a portion of the fluid flow pathway through the filter element 300.

The filter cover 350 of the filter element 300 is generally configured to fix the filter element 300 to a filtration system (not shown). In particular, the filter cover 350 is generally configured to be secured to a filter head of the filtration system. The filter cover 350 has one or more coupling elements 352 that are configured to be secured to the filter head. The one or more coupling elements 352 can be bolts, screws, a clamp(s), and the like. In some embodiments, the one or more coupling elements 352 can have a bayonet connector. The fill port 358 can be defined centrally to the filter cover 350, in some embodiments. The fill port 358 can share the central axis y with the filter media 310.

Particularly visible in FIG. 8, the sealing surface 360 of the filter element 300 is configured to create a fluid seal with filtration system components. In particular, the sealing surface 360 is generally configured to create a fluid seal with a filter head when the filter cover 350 is secured to the filter head. The sealing surface 360 is coupled to the spacer 340. The sealing surface 360 can have a variety of configurations, but in the current example, the sealing surface 360 defines protrusions 362, 366 extending towards the first end 312 of the filter media 310. The protrusions 362, 366 are configured to be sealably received by mating features of a filter head. In particular, each of the protrusions 362, 366 have a seal 364, 368 disposed thereon. The seals 364, 368 can be a variety of types of seals, but in the current embodiments the seals 364, 368 are each outer radial seals disposed about the protrusions 362, 366. In some embodiments the seals can be axial seals.

In the current example, the protrusions have a main protrusion 366, a first secondary protrusion 362, and a second secondary protrusion 362. The main protrusion 366 can generally be larger than the secondary protrusions 362, in some embodiments. For example, the main protrusion 366 can have a first perimeter length that is at least 3, 5, or 7 times the perimeter length of each of the first and second secondary protrusions 362, similar to as discussed above with reference to FIGS. 2 and 4A. The main protrusion 366 is central to the secondary protrusions 362. In various embodiments, the first secondary protrusion 362a is positioned 140°-220°, 160°-200°, or 170°-190° from the second secondary protrusion 362b relative to the central axis y, similar to as discussed above with reference to FIGS. 2 and 4B. In the current example, the first secondary protrusion 362a is about 180° from the second secondary protrusion 362b relative to the central axis y.

The seal disposed about the main protrusion 366 can be referred to as a main seal 368, and the seal disposed about the secondary protrusions 362 can be referred to as secondary seals 364. The main seal 368 is central to the secondary seals 364 in the current example. The secondary seals are positioned 140°-220°, 160°-200°, or 170°-190° from each other relative to the central axis y.

Figure 9:
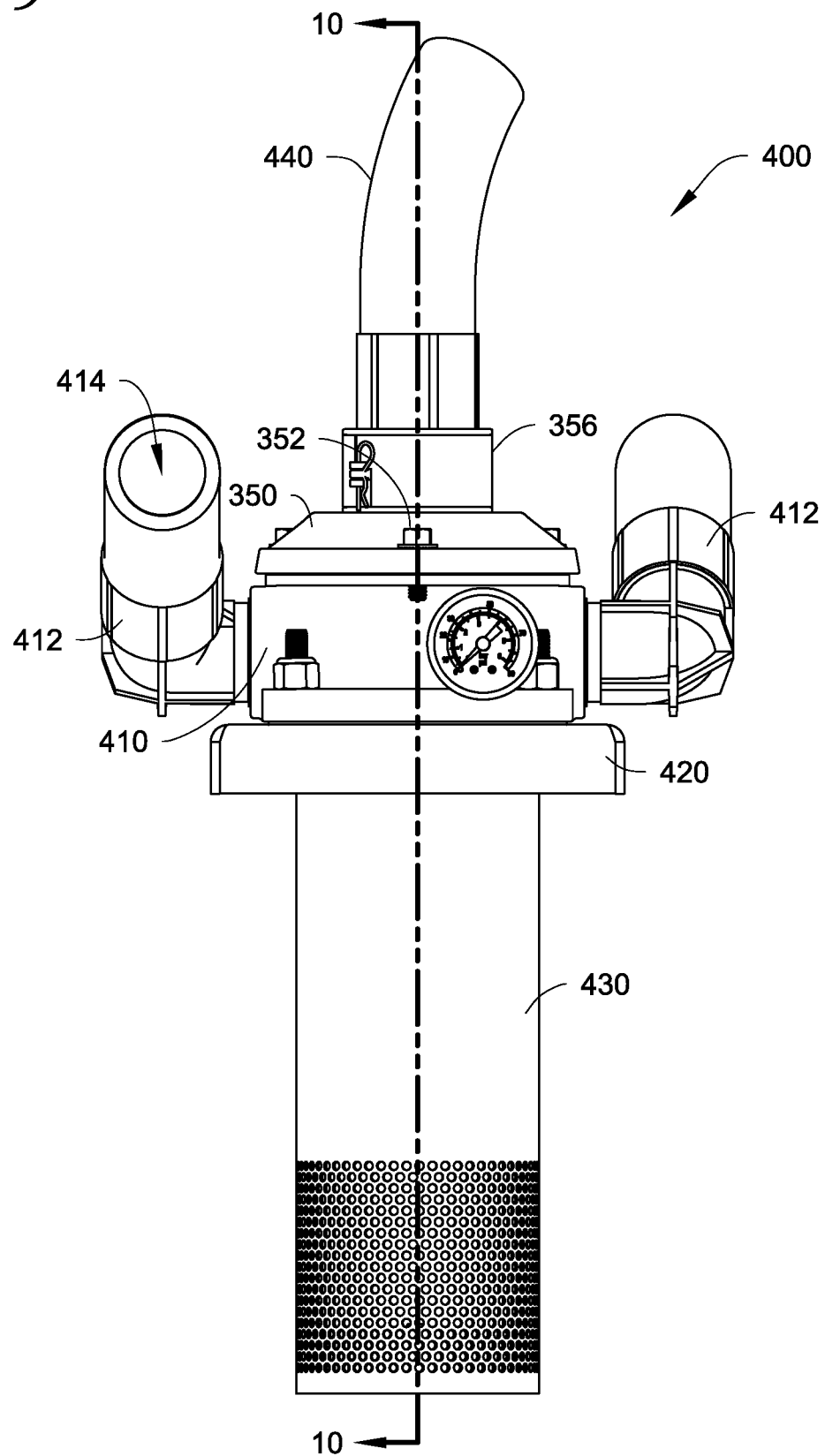
FIG. 9 is a facing view of an example implementation of a filter element consistent with FIG. 7.

The example filter element of FIGS. 7 and 8 is generally similar to the filter elements depicted and described with reference to FIGS. 1-6 with the addition of the fill port 358. FIG. 9 is a facing view of an example implementation of a filter element 300 consistent with FIG. 7, FIG. 10 is a first cross-sectional view the example implementation, and FIG. 11 is a second, detailed cross-sectional view of the example implementation.

The filter element 300 is installed in a filtration system 400. In particular, the filter media 310 of the filter element 300 is inserted into a housing diffuser 430 within a filter bowl 420 (only a portion of which is depicted for clarity), and the filter cover 350 is coupled to a filter head 410 via the coupling elements 352. The seals 364, 368 that are disposed on the respective protrusions 362, 366 of the sealing surface 360 each forms a seal with a corresponding structure of the filter head 410. Similarly, the endcap seal 322 disposed about the first endcap 320 forms a seal with a corresponding structure of the filter head 410. The corresponding structures of the filter head are inner radial surfaces, in the current example. Conduits 412 extend from the filter head 410 and define a fluid flow pathway 414 leading to the open volume 342 defined by the spacers 340.

Figure 10:
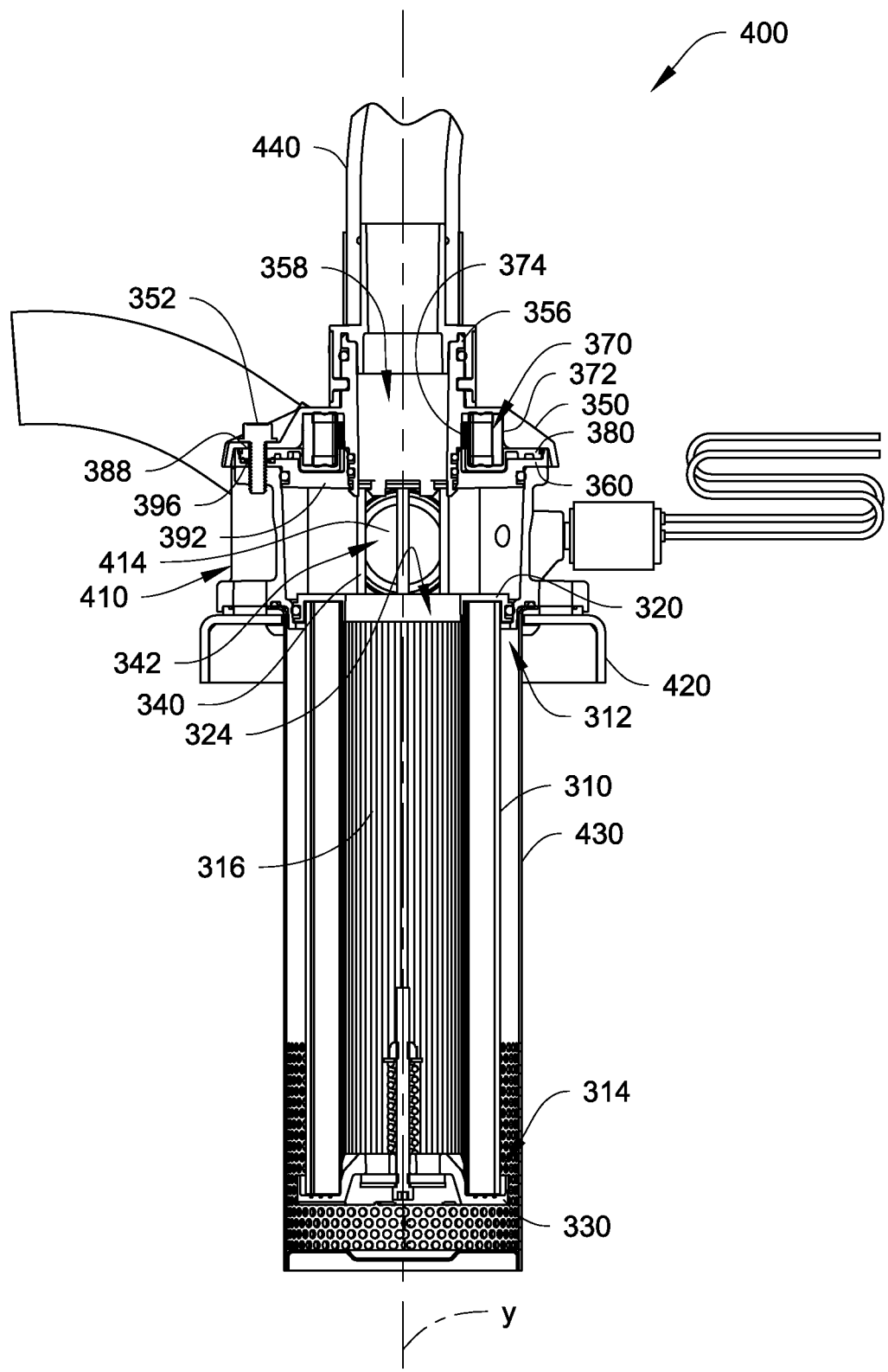
FIG. 10 is a first cross-sectional view of an example implementation consistent with FIG. 8.
Figure 11:
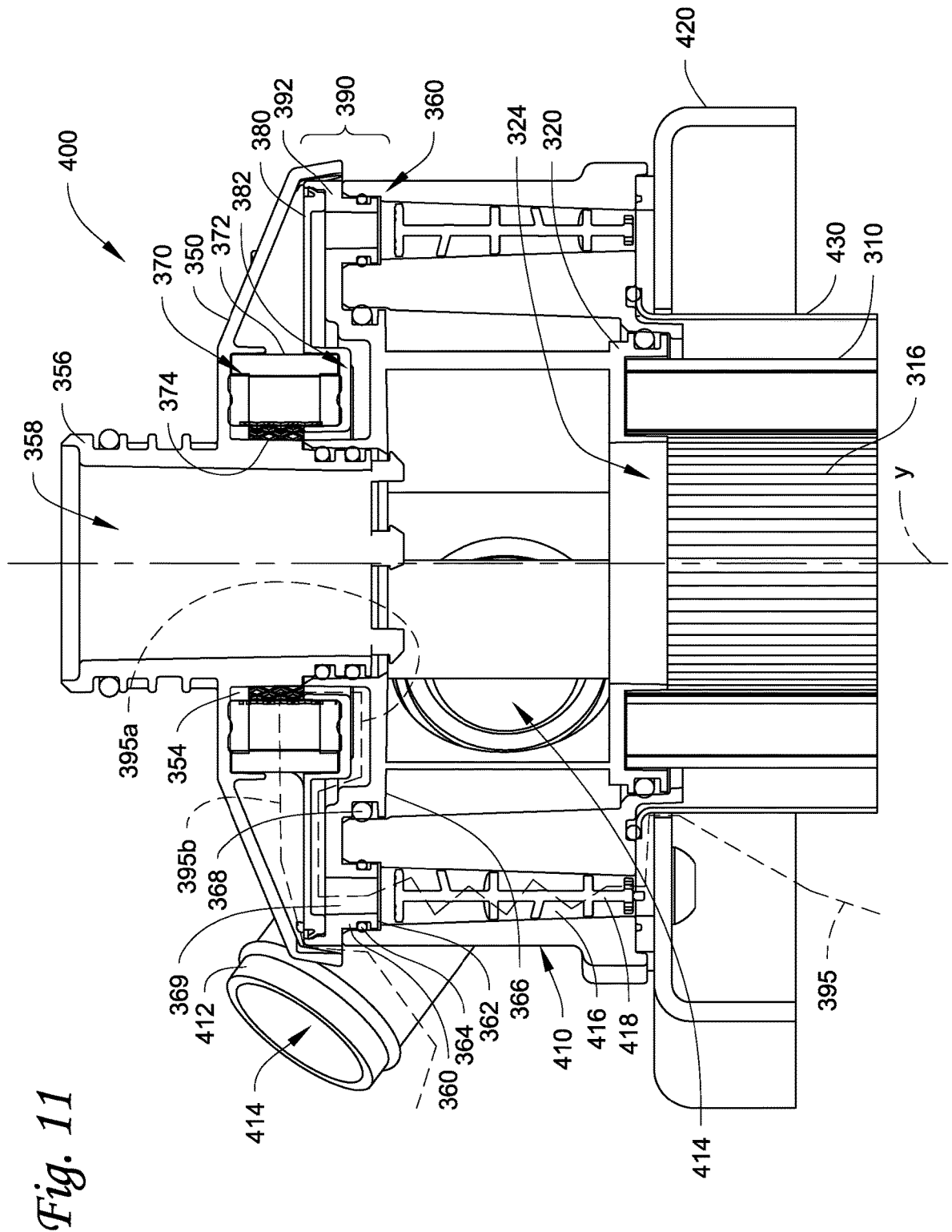
FIG. 11 is a second cross-sectional view, which is a detail view, of an example implementation consistent with FIG. 8.

The filter element 300 has generally been described above, but additional components of the filter element 300 are now visible, particularly in the cross-sectional views of FIGS. 10 and 11. For example, a breather filter 370 that is integral to the filter cover 350 is visible. Similar to the previous examples, the breather filter 370 is generally configured to filter gaseous fluid passing between the ambient environment and the filter element 300. In some embodiments the breather filter 370 is configured to prevent moisture in the ambient environment from passing into the filter element 300. The breather filter 370 can be those generally described above.

The breather filter 370 defines a first flow face 372 and a second flow face 374. In examples, the first flow face 372 is an outer radial flow face and the second flow face 374 is an inner radial flow face. The breather filter 370 defines a central opening about the fill port 358. In a variety of implementations, the first flow face 372 and the second flow face 374 each operate as both an upstream flow face and a downstream flow face, depending on whether gaseous fluid is entering or exiting the filter element 300. The filter element 310 generally defines an airflow pathway 395 (FIG. 11) from the ambient environment through the first flow face 372 and the second flow face 374 of the filter element 300. The breather filter 370 shares the central axis y with the filter media 310.

The breather filter 370 is disposed in a breather filter cavity 354, 382 that is mutually defined by the filter cover 350 and a breather filter housing 390. The filter cover 350 defines a first portion 354 of the breather filter cavity and the breather filter housing 390 defines a second portion 382 of the breather filter cavity. The filter cover 350 defines the tubular structure 356 that extends through the central opening of the breather filter 370 towards the first end 312 of the filter media 310. As visible in FIG. 10, a fill port tube 440 is sealably coupled to the tubular structure 356 to be in fluid communication with the fill port 358.

The breather filter housing 390 is coupled to the filter cover 350 and the first endcap 320. In particular, the spacers 340 extend between and are coupled to the endcap 320 and the breather filter housing 390. The breather filter housing 390 generally defines the sealing surface 360, which was described above in the discussion of FIGS. 1-2. In examples consistent with the current embodiment, the breather filter housing 390 has a main portion 392, which defines the sealing surface 360, and an airflow channel plate 380. The main portion 392 and the airflow channel plate 380 are generally fixed together. In particular, the main portion 392 defines first mating features 396 and the airflow channel plate 380 defines second mating features 388 (FIG. 10), where the first and second mating features are configured to be engaged by corresponding coupling elements 352 of the filter cover 350. The main portion 392 and the airflow channel plate 380 mutually define a first portion 395a of the tortuous airflow pathway 395 extending from the ambient environment to a flow face of the breather filter 370.

Similar to that depicted in the embodiments of FIGS. 3A and 3B, the airflow channel plate 380 defines a central opening and the main portion 392 of the breather filter housing 390 defines a central opening that are each in communication with the central opening of the breather filter 370, the open volume 342 defined by the spacers 340, and the central opening 316 of the filter media 310.

The secondary seals 364 on the secondary protrusions 362 of the sealing surface 360 surround a first end 369 of an airflow pathway defined by the breather filter housing 390 (FIG. 11). The airflow channel plate 380 is configured to nest within the main portion 392 of the breather filter housing 390 to define a portion of the tortuous airflow pathway 395 therebetween. The tortuous airflow pathway can prevent the passage of liquids and debris to the breather filter 370. When the filter element 300 is installed in a filtration system 400, the tortuous airflow pathway 395 can be oriented to enable the drainage of fluids under the force of gravity when the fluids might inadvertently enter the tortuous airflow pathway 395.

The tortuous airflow pathway 395 defined by the filtration system 400 is best visible in FIG. 11. The tortuous airflow pathway 395 has a first segment 395a and a second segment 395b defined by the filter element 300 (the filter element 300 itself is more clearly visible in FIGS. 7-8). Each of the first segment 395a and second segment 395b are tortuous. The main portion 392 of the breather filter housing 390 and the airflow channel plate 380 mutually define the first segment 395a of the tortuous airflow pathway that extends from a first end 369 of the airflow pathway defined by the secondary protrusion 362 to the second flow face 374 of the breather filter 370. The first end 369 of the airflow pathway 395a is in communication with the interior of the filter bowl 420 through the filter head 410. The filter head 410 defines an airflow channel 416 that is configured to be in sealable communication with the first end 369 of the first tortuous airflow pathway 395a defined by the secondary protrusion 362. A baffle 418 is disposed in the airflow channel 416 to create a tortuous flow pathway within the airflow channel 416, as well. When the filter element 300 is uninstalled, such as depicted in FIGS. 7-8, the first tortuous airflow pathway 395a is generally in communication with the ambient environment.

The second segment 395b of the tortuous airflow pathway 395 extends between the ambient environment and the first flow face 372 of the breather filter 370. As such, the first segment 395a and the second segment 395b are in communication through the breather filter 370. The second segment 395b of the tortuous airflow pathway 395 is defined by the filter cover 350. In various embodiments, including the one depicted, the second segment 395b of the tortuous airflow pathway 395 is mutually defined by the filter cover 350 and the breather filter housing 390, in particular, the airflow channel plate 380.

In examples consistent with the current embodiment, the first endcap 320, the spacers 340, and the main portion 392 of the breather filter housing 390 are a cohesive component. However, in some other embodiments, the first endcap 320, the spacers 340, and the main portion 392 of the breather filter housing 390 can be separate components that are coupled through various fastening structures. Also, while the main portion 392 of the breather filter housing 390 and the airflow channel plate 380 are separate components that are coupled together, in some embodiments the main portion 392 and the airflow channel plate 380 are a single, cohesive component.

Exemplary Embodiments

Embodiment 1. A filter element comprising:
a first endcap and a second endcap;
filter media extending between the first endcap and the second endcap, wherein the filter media defines a central opening and is coupled to the first endcap and the second endcap;
a breather filter housing coupled to the first endcap;
a filter cover coupled to the breather filter housing, wherein the breather filter housing and the filter cover mutually define a breather filter cavity; and
a breather filter disposed in the breather filter cavity, wherein the breather filter defines a first flow face and a second flow face, and wherein the breather filter housing defines a first tortuous airflow pathway between an ambient environment and the first flow face, and the filter cover defines a second tortuous airflow pathway between the ambient environment and the second flow face.

Embodiment 2. A filter element of one of embodiments 1 and 3-9, wherein the filter cover defines a fill port that is central to the filter cover.

Embodiment 3. A filter element of one of embodiments 1-2 and 4-9, wherein the fill port extends in the longitudinal direction.

Embodiment 4. A filter element of one of embodiments 1-3 and 5-9, wherein the breather filter comprises a desiccant.

Embodiment 5. A filter element of one of embodiments 1-4 and 6-9, wherein the breather filter comprises a regenerative hygroscopic filter.

Embodiment 6. A filter element of one of embodiments 1-5 and 7-9, the breather filter housing comprising a main portion and an airflow channel plate, wherein the main portion and the airflow channel plate mutually define the first tortuous airflow pathway.

Embodiment 7. A filter element of one of embodiments 1-6 and 8-9, further comprising a plurality of spacers extending between the first endcap and the breather filter housing.

Embodiment 8. A filter element of one of embodiments 1-7 and 9, wherein the first flow face of the breather filter is an outer radial flow face and the second flow face of the breather filter is an inner radial flow face; and wherein the breather filter and the filter media share a central axis.

Embodiment 9. A filter element of one of embodiments 1-8, wherein the filter media is pleated.

Embodiment 10. A filter element comprising:
- a first endcap and a second endcap;
- filter media extending between the first endcap and the second endcap, wherein the filter media defines a central opening and is coupled to the first endcap and the second endcap;
- a filter cover coupled to the first endcap; and
- a breather filter integral to the filter cover, wherein the breather filter defines a first flow face and a second flow face, and wherein the filter element defines an airflow pathway from ambient environment through the first flow face and the second flow face.

Embodiment 11. A filter element of one of embodiments 10 and 12-19, further comprising a breather filter housing coupled to the first endcap and the filter cover, wherein the breather filter housing and the filter cover mutually define a breather filter cavity and the breather filter is disposed in the breather filter cavity.

Embodiment 12. A filter element of one of embodiments 10-11 and 13-19, wherein the airflow pathway is tortuous.

Embodiment 13. A filter element of one of embodiments 1-12 and 14-19, wherein the filter cover defines a fill port that is central to the filter cover.

Embodiment 14. A filter element of one of embodiments 10-13 and 15-19, wherein the fill port extends in the longitudinal direction.

Embodiment 15. A filter element of one of embodiments 10-14 and 16-19, wherein the breather filter comprises a desiccant.

Embodiment 16. A filter element of one of embodiments 10-15 and 17-19, wherein the breather filter comprises a regenerative hygroscopic filter.

Embodiment 17. A filter element of one of embodiments 10-16 and 18-19, the first endcap comprising a main portion and an airflow channel plate, wherein the main portion and the airflow channel plate mutually define the airflow pathway.

Embodiment 18. A filter element of one of embodiments 10-17 and 19, further comprising a plurality of spacers extending from the first endcap to the breather filter housing.

Embodiment 19. A filter element of one of embodiments 10-18, wherein the first flow face of the breather filter is an outer radial flow face and the second flow face of the breather filter is an inner radial flow face; and wherein the breather filter and the filter media share a central axis.

Embodiment 20. A filter element comprising:
- filter media extending in a longitudinal direction, wherein the filter media has a first end and a second end and defines a central opening having a central axis;
- a first endcap coupled to the first end of the filter media;
- a spacer coupled to the first endcap, wherein the spacer extends away from the filter media in the longitudinal direction; and
- a sealing surface coupled to the spacer, the sealing surface comprising a plurality of seals comprising a main seal and two secondary seals, wherein the secondary seals are positioned 140°-220° from each other relative to the central axis.

Embodiment 21. A filter element of one of embodiments 20 and 22-29, wherein each of the two secondary seals are radial seals.

Embodiment 22. A filter element of one of embodiments 20-21 and 23-29, further comprising a breather filter housing defining the sealing surface, wherein each of the two secondary seals surround an airflow pathway defined by the breather filter housing.

Embodiment 23. A filter element of one of embodiments 20-22 and 24-29, further comprising a filter cover coupled to the breather filter housing, wherein the breather filter housing and the filter cover mutually define a breather filter cavity.

Embodiment 24. A filter element of one of embodiments 20-23 and 25-29, further comprising a breather filter disposed in the breather filter cavity, wherein the breather filter defines a first flow face and a second flow face.

Embodiment 25. A filter element of one of embodiments 20-24 and 26-29, wherein the breather filter housing defines a first tortuous airflow pathway between an ambient environment and the first flow face, and the filter cover defines a second tortuous airflow pathway between the ambient environment and the second flow face.

Embodiment 26. A filter element of one of embodiments 20-25 and 27-29, wherein the breather filter housing comprises a main portion and an airflow channel plate wherein the main portion and the airflow channel plate mutually define the first tortuous airflow pathway.

Embodiment 27. A filter element of one of embodiments 20-26 and 28-29, wherein the main seal is an outer radial seal.

Embodiment 28. A filter element of one of embodiments 20-27 and 29, wherein the main seal is central to the two secondary seals.

Embodiment 29. A filter element of one of embodiments 20-28, wherein the first endcap defines two protrusions extending toward the first end of the filter media and each secondary seal is disposed on a protrusion.

Embodiment 30. A filter element comprising:
- filter media extending in a longitudinal direction, wherein the filter media has a first end and a second end and defines a central opening; and
- a first endcap coupled to the first end of the filter media;
- a spacer coupled to the first endcap;
- a sealing surface coupled to the spacer, wherein the sealing surface defines a plurality of protrusions;
- wherein the spacer extends away from the filter media in the longitudinal direction between the first endcap and the sealing surface, and the plurality of protrusions each extend towards the first end of the filter media,
- wherein the plurality of protrusions comprises a main protrusion having a first perimeter length and a first secondary protrusion having a second perimeter length, and a second secondary protrusion having a third perimeter length, where the first perimeter length is at least ten times each of the second perimeter length and the third perimeter length.

Embodiment 31. A filter element of one of embodiments 30 and 32-38, wherein each of the plurality of protrusions has a seal disposed thereon.

Embodiment 32. A filter element of one of embodiments 30-31 and 33-38, wherein each seal is a radial seal.

Embodiment 33. A filter element of one of embodiments 30-32 and 34-38, wherein the first secondary protrusion is positioned 140°-220° from the second secondary protrusion relative to the main protrusion.

Embodiment 34. A filter element of one of embodiments 30-33 and 35-38, further comprising a breather filter housing defining the sealing surface, wherein each of the secondary seals surround an airflow pathway defined by the breather filter housing.

Embodiment 35. A filter element of one of embodiments 30-34 and 36-38, further comprising a filter cover coupled to the breather filter housing, wherein the breather filter housing and the filter cover mutually define a breather filter cavity.

Embodiment 36. A filter element of one of embodiments 30-35 and 37-38, further comprising a breather filter disposed in the breather filter cavity, wherein the breather filter defines a first flow face and a second flow face.

Embodiment 37. A filter element of one of embodiments 30-36 and 38, wherein the breather filter housing defines a first tortuous airflow pathway between an ambient environment and the first flow face, and the filter cover defines a second tortuous airflow pathway between the ambient environment and the second flow face.

Embodiment 38. A filter element of one of embodiments 30-37, wherein the breather filter housing comprises a main portion and an airflow channel plate wherein the main portion and the airflow channel plate mutually define the first tortuous airflow pathway.

It should also be noted that, as used in this specification and the appended claims, the phrase "configured" describes a system, apparatus, or other structure that is constructed to perform a particular task or adopt a particular configuration. The phrase "configured" can be used interchangeably with other similar phrases such as "arranged", "constructed", "manufactured", and the like.

All publications and patent applications in this specification are indicative of the level of ordinary skill in the art to which the present technology pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

We claim:

1. A filter element comprising:
   a first endcap and a second endcap;
   filter media extending between the first endcap and the second endcap, wherein the filter media defines a central opening and is coupled to the first endcap and the second endcap;
   a breather filter housing coupled to the first endcap;
   a filter cover coupled to the breather filter housing, wherein the breather filter housing and the filter cover mutually define a breather filter cavity; and
   a breather filter disposed in the breather filter cavity, wherein the breather filter defines a first flow face and a second flow face, and wherein the breather filter housing defines a first tortuous airflow pathway between an ambient environment and the first flow face, and the filter cover defines a second tortuous airflow pathway between the ambient environment and the second flow face.

2. A filter element of claim 1, wherein the filter cover defines a fill port that is central to the filter cover.

3. A filter element of claim 2, wherein the fill port extends in a longitudinal direction.

4. A filter element of claim 1, wherein the breather filter comprises a desiccant.

5. A filter element of claim 1, wherein the breather filter comprises a regenerative hygroscopic filter.

6. A filter element of claim 1, the breather filter housing comprising a main portion and an airflow channel plate, wherein the main portion and the airflow channel plate mutually define the first tortuous airflow pathway.

7. A filter element of claim 1, further comprising a plurality of spacers extending between the first endcap and the breather filter housing.

8. A filter element of claim 1, wherein the first flow face of the breather filter is an outer radial flow face and the second flow face of the breather filter is an inner radial flow face; and wherein the breather filter and the filter media share a central axis.

9. A filter element of claim 1, wherein the filter media is pleated.

10. A filter element of claim 1, further comprising:
    the filter media extending in a longitudinal direction, wherein the filter media has a first end and a second end and the central opening has a central axis;
    the first endcap coupled to the first end of the filter media;
    a spacer coupled to the first endcap, wherein the spacer extends away from the filter media in the longitudinal direction; and
    a sealing surface coupled to the spacer, the sealing surface comprising a plurality of seals comprising a main seal and two secondary seals, wherein the two secondary seals are positioned 140°-220° from each other relative to the central axis.

11. A filter element of claim 10, wherein each of the two secondary seals are radial seals.

12. A filter element of claim 10, further comprising the breather filter housing defining the sealing surface, wherein each of the two secondary seals surround an airflow pathway defined by the breather filter housing.

13. A filter element of claim 10, wherein the main seal is an outer radial seal.

14. A filter element of claim 10, wherein the main seal is central to the two secondary seals.

15. A filter element of claim 10, wherein the first endcap defines two protrusions extending toward the first end of the filter media and each secondary seal is disposed on a protrusion.

16. A filter element of claim 10, wherein the breather filter housing defines the sealing surface, and each of the two secondary seals surrounds an end of the first tortuous airflow pathway defined by the breather filter housing.

17. A filter element of claim 1, further comprising:
    a spacer coupled to the first endcap;
    a sealing surface coupled to the spacer, wherein the sealing surface defines a plurality of protrusions, wherein the spacer extends away from the filter media in a longitudinal direction between the first endcap and the breather filter housing, and the plurality of protrusions each extends towards a first end of the filter media.

18. A filter element of claim 17, wherein the plurality of protrusions comprises a main protrusion having a first perimeter length, and a first secondary protrusion having a second perimeter length, and a second secondary protrusion having a third perimeter length, where the first perimeter length is at least ten times each of the second perimeter length and the third perimeter length.

19. A filter element of claim 17, wherein each of the plurality of protrusions has a seal disposed thereon.

20. A filter element of claim 1, wherein the breather filter is integral to the filter cover.

\* \* \* \* \*